US012666328B2

(12) United States Patent
Hu

(10) Patent No.: US 12,666,328 B2
(45) Date of Patent: Jun. 23, 2026

(54) METHOD FOR CELL HANDOVER, AND TERMINAL DEVICE

(71) Applicant: GUANGDONG OPPO MOBILE TELECOMMUNICATIONS CORP., LTD., Dongguan (CN)

(72) Inventor: Rongyi Hu, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 298 days.

(21) Appl. No.: 18/524,826

(22) Filed: Nov. 30, 2023

(65) Prior Publication Data

US 2024/0098594 A1     Mar. 21, 2024

Related U.S. Application Data

(63) Continuation of application No. PCT/CN2021/097372, filed on May 31, 2021.

(51) Int. Cl.
*H04W 36/08* (2009.01)
*H04W 36/00* (2009.01)

(52) U.S. Cl.
CPC ....... *H04W 36/08* (2013.01); *H04W 36/0061* (2013.01)

(58) Field of Classification Search
CPC ............. H04W 36/08; H04W 36/0061; H04W 36/00698; H04W 36/249; H04W 74/0833; H04W 36/0069
See application file for complete search history.

(56) References Cited

U.S. PATENT DOCUMENTS

| | | | |
|---|---|---|---|
| 10,405,248 B2 | 9/2019 | Fan | |
| 10,945,176 B2 | 3/2021 | Fan | |
| 2018/0352487 A1 | 12/2018 | Fan | |
| 2019/0387442 A1 | 12/2019 | Fan | |
| 2021/0400760 A1* | 12/2021 | Yang | ..................... H04W 76/19 |
| 2023/0180075 A1* | 6/2023 | Cui | ................. H04W 36/00698 |
| | | | 370/331 |
| 2023/0262546 A1* | 8/2023 | Teyeb | ............... H04W 36/0069 |
| | | | 370/331 |

(Continued)

FOREIGN PATENT DOCUMENTS

| | | |
|---|---|---|
| CN | 107690163 A | 2/2018 |
| CN | 111385789 A | 7/2020 |

(Continued)

OTHER PUBLICATIONS

CN113395716A (Year: 2025).*

(Continued)

*Primary Examiner* — Charles R Craver
(74) *Attorney, Agent, or Firm* — BAYES PLLC

(57) ABSTRACT

A method for cell handover, including: determining, by a terminal device, a capability of the terminal device, the capability including support or nonsupport for processing a first procedure and a second procedure in parallel, the first procedure being associated with a PCell handover, and the second procedure being associated with a PSCell addition; and performing, by the terminal device, the first procedure and the second procedure based on the capability.

20 Claims, 6 Drawing Sheets

A terminal device determines a capability of the terminal device, where the capability includes support or nonsupport for processing a first procedure and a second procedure in parallel, the first procedure is associated with a PCell handover, and the second procedure is associated with a PSCell addition

501

The terminal device performs the first procedure and the second procedure based on the capability

502

(56)                    References Cited

U.S. PATENT DOCUMENTS

| | | | | |
|---|---|---|---|---|
| 2023/0328606 A1* | 10/2023 | Cui | H04W 36/00725 | |
| | | | | 370/331 |
| 2024/0049068 A1* | 2/2024 | Tang | H04W 36/08 | |
| 2024/0056960 A1* | 2/2024 | Axmon | H04W 48/20 | |
| 2024/0414608 A1* | 12/2024 | Chen | H04W 36/249 | |

FOREIGN PATENT DOCUMENTS

| | | | | | |
|---|---|---|---|---|---|
| CN | 111479299 | A | 7/2020 | | |
| CN | 112584304 | A | 3/2021 | | |
| CN | 112788676 | A | 5/2021 | | |
| WO | WO-2021051357 A1 | * | 3/2021 | | H04W 76/19 |
| WO | WO-2022155302 A2 | * | 7/2022 | | H04W 36/00837 |

OTHER PUBLICATIONS

WO-2022237740-A1 (Year: 2022).*

International Search Report in the international application No. PCT/CN2021/097372, mailed on Mar. 2, 2022. 6 pages with English translation.

Written Opinion of the International Search Authority in the international application No. PCT/CN2021/097372, mailed on Mar. 2, 2022. 6 pages with English translation.

3GPP TSG-RAN4 Meeting #98bis-e R4-2104685 E-meeting, Apr. 12-Apr. 20, 2021, Title: Discussion on RRM requirements for handover with PSCell, Source: Xiaomi, Agenda Item: 8.4.2.2, Document for: Discussion. Units 1-3. 4 pages.

3GPP TSG RAN Meeting #90-e RP-202874 (revision of RP-202053), Electronic Meeting, Dec. 7-11, 2020, Agenda item: 9.8.19, Source: Apple, Title: Revised WID of REL-17 NR RRM further enhancement, Document for: Approval. the whole document. 4 pages.

3GPP Ts 37.340 V16.5.0 (Mar. 2021), 3rd Generation Partnership Project; Technical Specification Group Radio Access Network; Evolved Universal Terrestrial Radio Access (E-UTRA) and NR; Multi-connectivity; Stage 2 (Release 16). pp. 10-76. 84 pages.

3GPP TS 38.133 V16.7.0 (Mar. 2021), 3rd Generation Partnership Project; Technical Specification Group Radio Access Network; NR; Requirements for support of radio resource management (Release 16). Chapter 6,8. 1977 pages.

Qualcomm CDMA Technologies: "Further views on timeline assumptions for HO with PScell",3GPP Draft; R4-2109732, 3rd Generation Partnership Project (3GPP), Mobilecompetence Centre ; 650, Route Des Lucioles ; F-06921 Sophia-Antipolis Cedex France vol. RAN WG4, no, Electronic Meeting;May 19, 2021-May 27, 2021, May 11, 2021 (May 11, 2021), XP052008450, the whole document, 2 pages.

NEC: "Discussion on PSCell HO", 3GPP Draft; R4-2104980, 3rd Generation Partnership Project (3GPP), Mobile Competence Centre ;650, Route Des Lucioles; F-06921 Sophia-Antipolis Cedex; France vol. RAN WG4, no. E-Meeting; 202104122021042, Apr. 2, 2021 (Apr. 2, 2021), XP052175967, the whole document, 5 pages.

Qualcomm CDMA Technologies: "Views on specifying the requirements for HO with PScell", 3GPP Draft; R4-2102625, 3rd Generation Partnership Project (3GPP), MobileCompetence Centre ; 650, Route Des Lucioles ; F-06921 Sophia-Antipolis Cedex France vol. RAN WG4, No. Electronic Meeting;Jan. 25, 2021-Feb. 5, 2021, Jan. 15, 2021 (Jan. 15, 2021), XP052180850, the whole document, 4 pages.

Huawei et al: "Discussion on requirements for HO with PSCell", 3GPP Draft; R4-2110344, 3rd Generation Partnership Project (3GPP), Mobilecompetence Centre ; 650, Route Des Lucioles ; F-06921 Sophia-Antipolis Cedex; France vol. RAN WG4, no. Electronic Meeting;May 19, 2021-May 27, 2021, May 11, 2021 (May 11, 2021), XP052008907, the whole document, 5 pages.

Supplementary European Search Report in the European application No. 21943424.8, mailed on May 31, 2024, 10 pages.

* cited by examiner

100

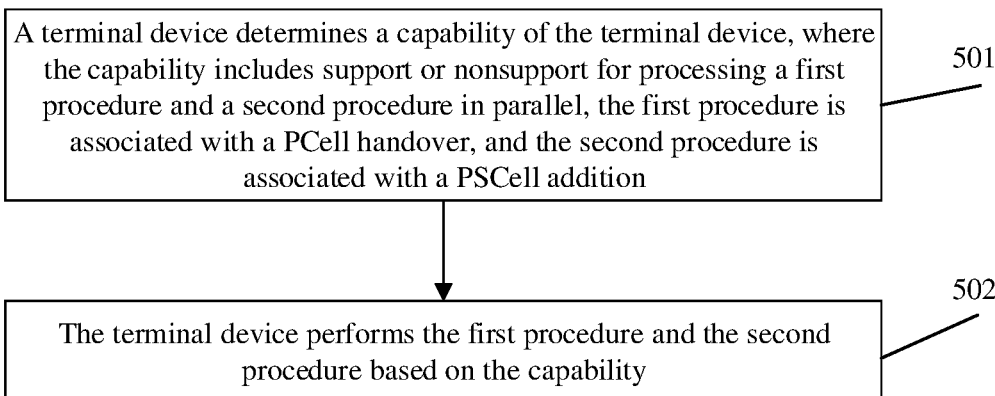

A terminal device determines a capability of the terminal device, where the capability includes support or nonsupport for processing a first procedure and a second procedure in parallel, the first procedure is associated with a PCell handover, and the second procedure is associated with a PSCell addition                501

The terminal device performs the first procedure and the second procedure based on the capability                502

FIG. 5

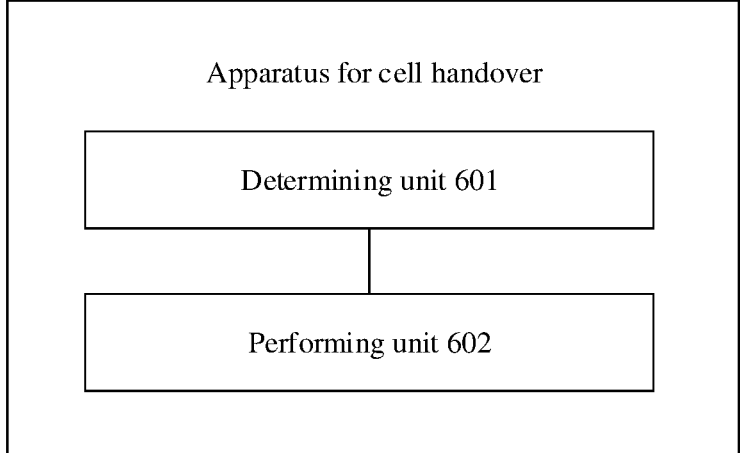

Apparatus for cell handover

Determining unit 601

Performing unit 602

FIG. 6

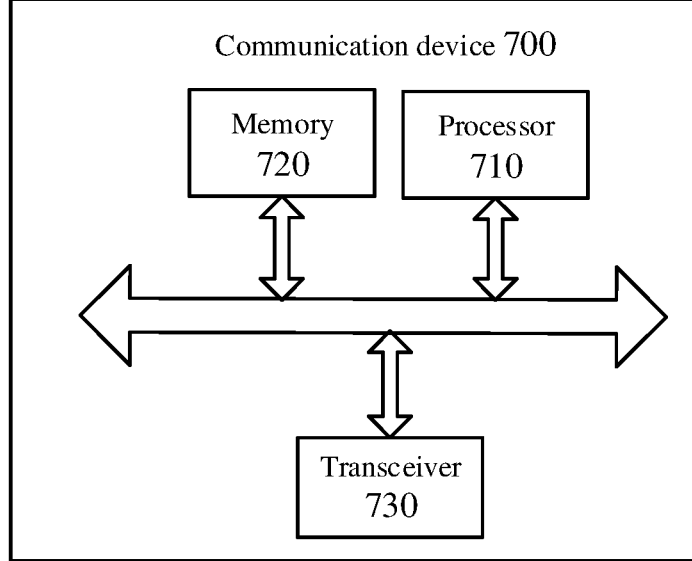

Communication device 700

Memory 720

Processor 710

Transceiver 730

FIG. 7

METHOD FOR CELL HANDOVER, AND TERMINAL DEVICE

CROSS-REFERENCE TO RELATED APPLICATION

This application is a continuation of International Application No. PCT/CN2021/097372 filed on May 31, 2021, the disclosure of which is hereby incorporated by reference in its entirety.

TECHNICAL FIELD

Embodiments of the present disclosure relate to the field of mobile communication technology, in particular to a method for cell handover, and a terminal device.

BACKGROUND

When a Primary Cell (Pcell) handover is performed, a Primary Secondary Cell (PScell) can be added quickly. This procedure is called a Pcell handover (HO) procedure with PScell addition (abbreviated as HO with PScell). The fast Carrier Aggregation (CA) or Dual Connectivity (DC) establishment can be realized through this procedure, thus improving the data transmission capability and the cell throughput of the terminal device.

At present, how to perform the PCell HO procedure and PSCell addition procedure reasonably in the HO with PSCell procedure needs to be solved.

BRIEF DESCRIPTION OF THE DRAWINGS

The drawings illustrated herein serve to provide a further understanding of and constitute a part of the present disclosure, and the illustrative embodiments of the present disclosure and the description thereof are used to explain the present disclosure and do not constitute an improper limitation of the present disclosure.

FIG. 5 is a schematic flowchart of a method for cell handover provided by an embodiment of the present disclosure.

FIG. 6 is a schematic diagram of a structure composition of an apparatus for cell handover provided by an embodiment of the present disclosure.

FIG. 7 is a schematic structural diagram of a communication device provided by an embodiment of the present disclosure.

DETAILED DESCRIPTION

The technical solutions of the embodiments of the present disclosure will be described below in combination with the drawings in the embodiments of the present disclosure. It will be obvious that the described embodiments are part of the embodiments of the present disclosure, but not all of them. Based on the embodiments in the present disclosure, all other embodiments obtained by those of ordinary skill in the art without making creative efforts fall within the scope of protection of the present disclosure.

Figure 1:
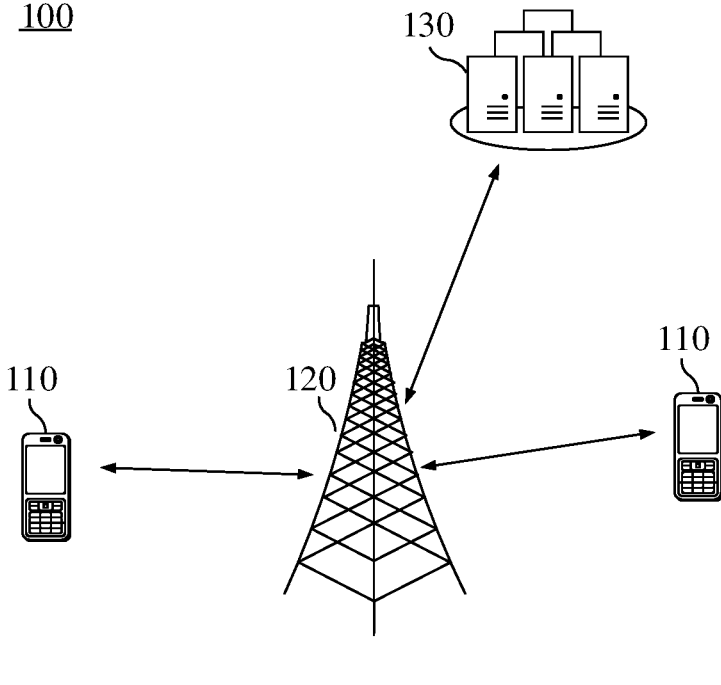
FIG. 1 is a schematic diagram of an application scenario according to an embodiment of the present disclosure.

FIG. 1 is a schematic diagram of an application scenario according to an embodiment of the present disclosure.

As shown in FIG. 1, the communication system 100 may include terminal devices 110 and a network device 120. The network device 120 may communicate with the terminal devices 110 through an air interface. Multi-service transmission is supported between the terminal devices 110 and the network device 120.

It should be understood that embodiments of the present disclosure are illustrative only with the communication system 100, but are not limited thereto. That is, the technical solutions of the embodiments of the present disclosure may be applied to various communication systems, such as: Long Term Evolution (LTE) system, LTE Time Division Duplex (TDD), Universal Mobile Telecommunication System (UMTS), Internet of Things (IoT) system, Narrow Band Internet of Things (NB-IoT) system, enhanced Machine-Type Communications (eMTC) system, 5G communication system (also called New Radio (NR) communication system), or future communication system, etc.

In the communication system 100 shown in FIG. 1, the network device 120 may be an access network device that communicates with the terminal device 110. The access network device may provide communication coverage for a particular geographic area, and may communicate with the terminal devices (UE) 110 located within the coverage area.

The network device 120 may be an Evolutional Node B (eNB or eNodeB) in a Long Term Evolution (LTE) system, or a Next Generation Radio Access Network (NG RAN) device, or a base station (gNB) in an NR system, or a wireless controller in a Cloud Radio Access Network (CRAN), or the network device 120 may be a relay station, an access point, a vehicle-mounted device, a wearable device, a hub, a switch, a bridge, a router, or a network device in a future evolutional Public Land Mobile Network (PLMN), etc.

The terminal device 110 may be any terminal device, which includes but not limited to a terminal device in wired or wireless connection with the network device 120 or other terminal devices.

For example, the terminal device 110 may refer to an access terminal, a User Equipment (UE), a subscriber unit, a subscriber station, a mobile station, a mobile stage, a remote station, a remote terminal, a mobile device, a user terminal, a terminal, a wireless communication device, a user agent, or a user device. The access terminal may be a cellular telephone, a cordless telephone, a Session Initiation Protocol (SIP) telephone, an IoT device, a satellite handheld terminal, a Wireless Local Loop (WLL) station, a Personal Digital Assistant (PDA), a handheld device having a wireless communication function, a computing device or other processing device connected to a wireless modem, a vehicle-mounted device, a wearable device, a terminal device in a 5G network or a terminal device in a future evolution network, etc.

The terminal devices 110 may be used for Device to Device (D2D) communication.

The wireless communication system 100 may further include a core network device 130 that communicates with the base station. The core network device 130 may be a 5G Core (5GC) device, for example, an Access and Mobility Management Function (AMF), another example, an Authentication Server Function (AUSF), another example, a User Plane Function (UPF), and another example, a Session Management Function (SMF). Alternatively, the core network device 130 may also be an Evolved Packet Core (EPC) device in the LTE network, for example, a Session Management Function+Core Packet Gateway (SMF+PGW-C) device. It should be understood that SMF+PGW-C can realize the functions realized by the SMF and the PGW-C simultaneously. In the process of network evolution, the above core network device may also be called by other names, or a new network entity may be formed by dividing the functions of the core network, which is not limited by the embodiments of the present disclosure.

Various function units in the communication system 100 may also establish a connection through a next generation (NG) interface to realize communication.

For example, the terminal device establishes air interface connection with the access network device through a NR interface to transmit user plane data and control plane signaling. The terminal device may establish the control plane signaling connection with the AMF through an NG interface 1 (abbreviated as N1). The access network device, such as a next generation radio access base station (gNB), may establish the user plane data connection with the UPF through an NG interface 3 (abbreviated as N3). The access network device may establish the control plane signaling connection with the AMF through an NG interface 2 (abbreviated as N2). The UPF may establish the control plane signaling connection with the SMF through an NG interface 4 (abbreviated as N4). The UPF may interact user plane data with a data network through an NG interface 6 (abbreviated as N6). The AMF may establish the control plane signaling connection with the SMF through an NG interface 11 (abbreviated as N11). The SMF may establish the control plane signaling connection with the PCF through an NG Interface 7 (abbreviated as N7).

FIG. 1 exemplarily illustrates one base station, one core network device and two terminal devices. Alternatively, the wireless communication system 100 may include a plurality of base station devices, and other numbers of terminal devices may be included within the coverage area of each base station, which is not limited by the embodiments of the present disclosure.

It should be noted that FIG. 1 only illustrates by way of example the system to which the present disclosure applies, and of course the method shown in the embodiments of the present disclosure may also be applicable for other systems. In addition, the terms "system" and "network" are often used interchangeably herein. In the present disclosure, the term "and/or" is merely an association relationship that describes associated objects, which indicate that there may be three relationships. For example, "A and/or B" may mean that there are three situations: A exists alone, A and B exist simultaneously, and B exists alone. In addition, the character "/" in the present disclosure generally indicates that there is "or" relationship between objects associated before and after. It should also be understood that the reference to "indication" in embodiments of the present disclosure may be a direct indication, may be an indirect indication, and may also be indicative of an association relationship. For example, "A indicates B" may mean that A directly indicates B, for example, B may be obtained through A. It may also mean that A indirectly indicates B, for example, A indicates C, and B may be obtained by C. It may also indicate that there is an association relationship between A and B. It should also be understood that the reference to "corresponding" in embodiments of the present disclosure may mean that there is a direct or indirect correspondence relationship between the two objects, may also mean that there is an association relationship between the two objects, may also be a relationship between indication and being indicated, configuration and being configured, etc. It should also be understood that the "predefined" or "a predefined rule" referred to in embodiments of the present disclosure may be implemented by pre-storing corresponding codes, tables, or other means that may be used to indicate relevant information in the device (e.g., including the terminal device and the network device), the specific implementation of which is not limited by the present disclosure. For example, the "predefined" may refer to what is defined in the protocol. It should also be understood that, in embodiments of the present disclosure, the "protocol" may refer to standard protocols in the communication field, such as LTE protocol, NR protocol, and related protocols applied in future communication systems, which are not limited in the present disclosure.

In order to facilitate understanding of the technical solutions of the embodiments of the present disclosure, the related technologies of the embodiments of the present disclosure are described below, and the following related technologies as alternative solutions may be arbitrarily combined with the technical solutions of the embodiments of the present disclosure, all of which belong to the protection scope of the embodiments of the present disclosure.

Handover (HO)

Figure 2:
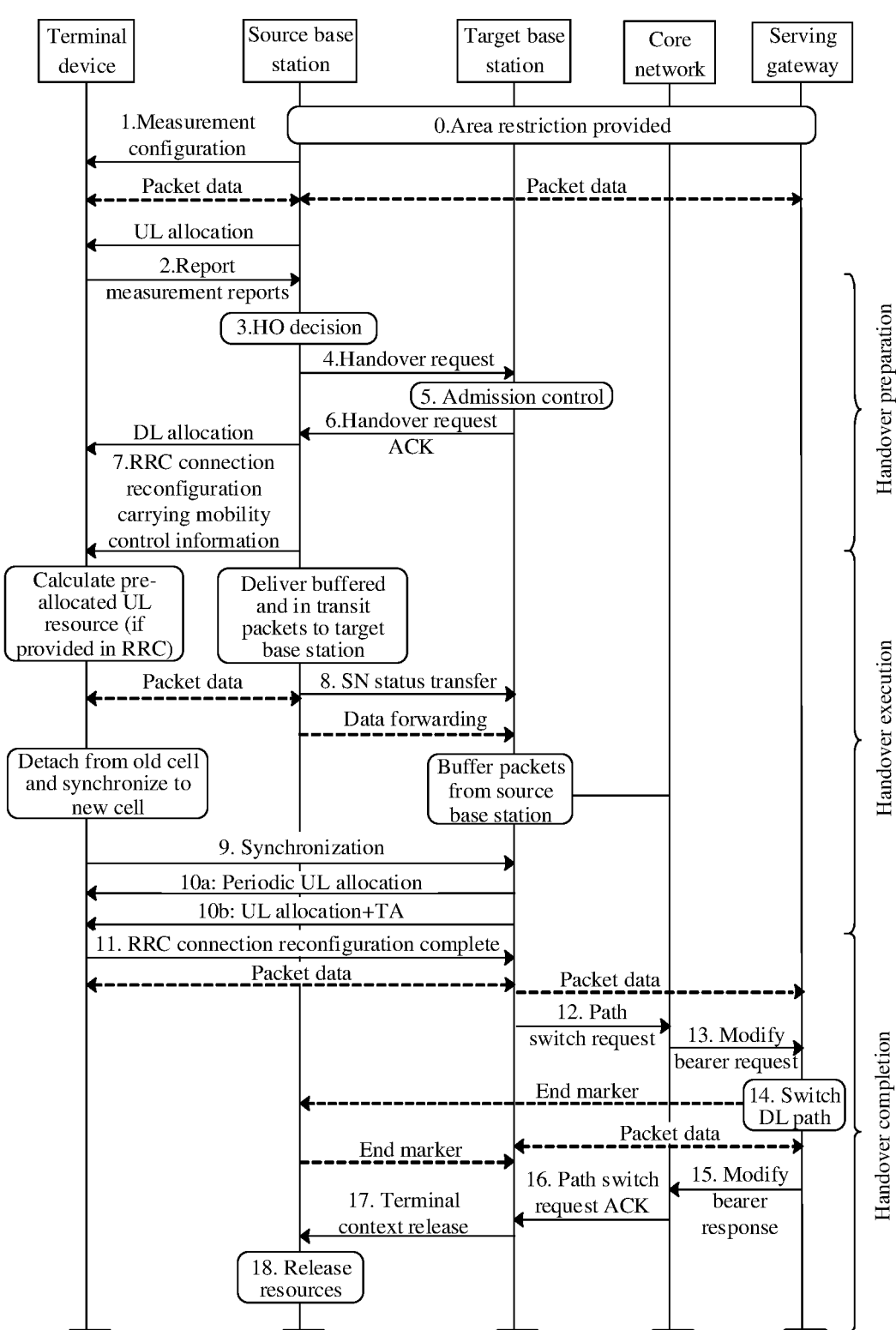
FIG. 2 is a flowchart of a handover provided by an embodiment of the present disclosure.

Referring to FIG. 2, FIG. 2 is a flowchart of a handover provided by an embodiment of the present disclosure. The flowchart mainly includes the following operations.

1. The source base station transmits the measurement configuration to the terminal device.
2. The terminal device performs relevant measurements based on the measurement configuration and reports the measurement reports to the source base station.
3. The source base station makes a handover decision based on the measurement reports.
4. The source base station initiates a handover Request to the target base station.
5. The target base station performs an admission control.
6. The target base station transmits a handover request Acknowledge (ACK) message to the source base station.
7. The source base station transmits a Radio Resource Control (RRC) connection reconfiguration message to the terminal device. The RRC connection reconfiguration message carries mobility control information of the target base station.

Here, the RRC connection reconfiguration message is carried in the handover command.

8. The source base station performs Serial Number (SN) status transfer to the target base station.
9. The terminal device synchronizes to the target base station.
10a. The target base station performs periodic Uplink (UL) allocation for the terminal device.
10b. The target base station configures an UL allocation and a Tracking Area (TA) for the terminal device.
11. The terminal device transmits the RRC connection reconfiguration complete message to the target base station.
12. The target base station initiates a path switch request to the core network.
13. The core network initiates a modify bearer request to the serving gateway.

14. The serving gateway switches the Downlink (DL) path.

15. The serving gateway transmits a modify bearer response message to the core network.

16. The core network transmits a path switch request ACK message to the target base station.

17. The target base station notifies the source base station to release the terminal context.

18. The source base station releases resources.

The handover procedure in the above FIG. 2 mainly includes the following flow.

Handover preparation (operations 2-6 in FIG. 2): the source base station configures the terminal device to perform measurement report, and transmits a handover request to the target base station based on the measurement reports reported by the terminal device. After agreeing to the handover request, the target base station will configure the RRC message for the terminal device. The RRC message carries mobility control information, which includes a Random Access Channel (RACH) resource, a Cell-Radio Network Temporary Identifier (C-RNTI), security algorithm for the target base station, a system message of the target base station, etc.

Handover execution (operations 7-11 in FIG. 2): the source base station forwards the mobility control information to the terminal device through the handover command, and the terminal device initiates a random access procedure to the target base station after receiving the handover command. Furthermore, the source base station performs the SN status transfer to the target base station, and notifies the target base station an uplink Packet Data Convergence Protocol, PDCP) SN receiving state and a downlink PDCP SN transmitting state.

Handover completion (operations 12-18 in FIG. 2): after the terminal device successfully accesses the target base station (i.e., the random access is successful), the target base station will initiate a path switch request to request the core network to switch the downlink path. After the path switch is completed, the target base station will instruct the source base station to release the terminal context and the handover is completed.

Conditional Handover

For some special scenarios, such as high-speed mobile terminal devices or high-frequency scenarios, the terminal device is needed to be switched frequently between multiple cells. Compared with the handover procedure shown in FIG. 2, the problem of long handover preparation time leading to longer handover delay of the terminal device can be avoided by the conditional handover.

Figure 3:
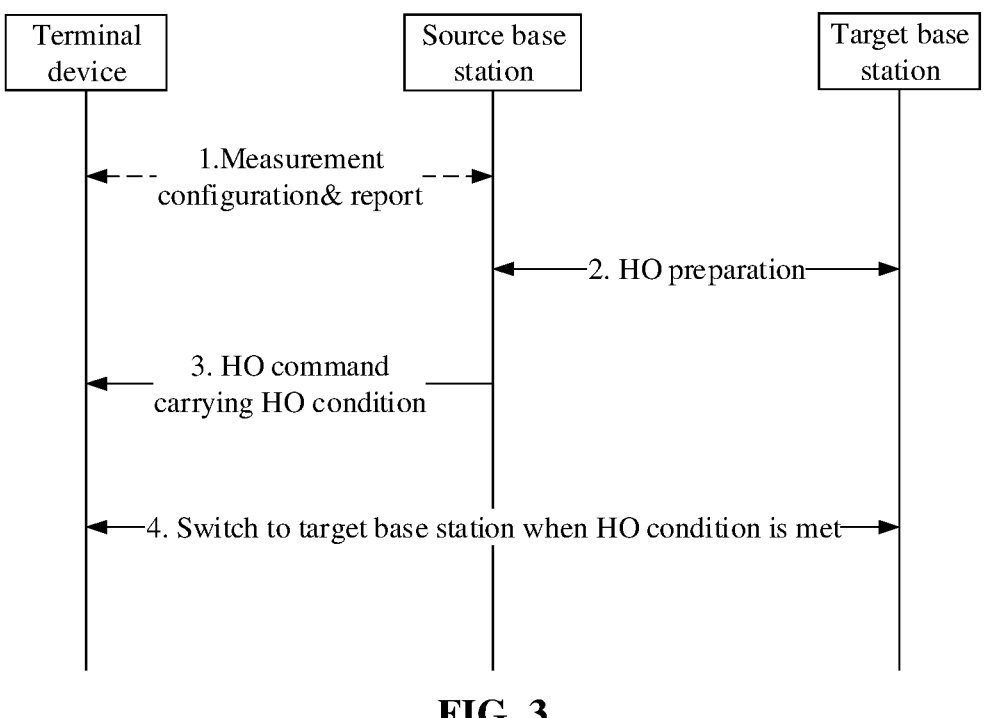
FIG. 3 is a flowchart of a conditional handover provided by an embodiment of the present disclosure.

Referring to FIG. 3, FIG. 3 is a flowchart of a conditional handover provided by an embodiment of the present disclosure. The flowchart mainly includes the following operations.

1. The source base station performs measurement configuration, and the terminal device performs measurement report based on the measurement configuration.

2. The handover preparation is performed between the source base station and the target base station.

3. The source base station transmits a handover command to the terminal device, and the handover command carries the configuration information of the target cell and the handover condition of the target cell.

4. The terminal device determines whether the handover condition is met, and if the handover condition is met, the terminal device switches to the target base station according to the configuration information of the target cell.

Here, the source base station configures a handover command for the terminal device in advance, and the terminal device does not need to repeatedly perform the operations 1-3 to obtain the handover command during each handover, but only needs to determine whether the handover condition is met, and switches to the target base station when the handover condition is met.

For some special scenarios, such as high-speed rail scenario, the running track of terminal device is specific, so the source base station may allocate the target base station to the terminal device in advance, and carry the handover condition for triggering the terminal device to switch in the handover command. When the handover condition is met, the terminal device initiates an access request to the target base station.

In some embodiments, the source base station may carry configuration information of multiple target cells and corresponding handover conditions in the handover command, and the terminal device determines which target cell to access based on the currently met handover condition.

0 ms Interruption HO

The handover causes transmission interruption, and the following two types of handover may shorten the interruption time.

DC based HO: During handover, the target base station is first added as a Secondary Node (SN), then the SN (i.e., the target base station) is changed into a Master Node (MN) through role change signaling, and finally the source base station is released, so as to reduce the interruption time during handover.

Enhanced Mobile Broadband (eMBB) based HO: When receiving the handover command, the terminal device continues to maintain the connection with the source base station and initiates random access to the target base station simultaneously, and then releases the connection with the source base station until the terminal device is connected completely to the target base station.

Carrier Aggregation (CA)

CA, that is, resources on multiple Component Carrier (CC) are jointly scheduled and used, so that NR system can support larger bandwidth, thus achieving higher system peak rate. According to the continuity of the aggregated carrier in spectrum, it may be divided into continuous CA and discontinuous CA. According to whether the bands in which the aggregated carriers are located are the same, it may be divided into intra-band CA and inter-band CA.

In the CA, there is only one Primary Cell Component (PCC), and the PCC provides RRC signaling connection, Non-Access Stratum (NAS) function, security and so on. The Physical Uplink Control Channel (PUCCH) exists on and only on the PCC. In the CA, there may be one or more Secondary Cell Components (SCC), and the SCC only provides additional radio resources. The PCC and the SCC are both called serving cells, the cell on PCC is the Pcell and the cell on SCC is the secondary cell (Scell). In the standard, it is also stipulated that the up to 5 aggregated carriers are supported, that is, the maximum bandwidth after aggregation is 100 MHZ, and the aggregated carriers belong to the same base station. The same Cell-Radio Network Temporary Identifier (C-RNTI) is used for all aggregated carriers. The base station ensures that C-RNTI does not conflict in the cell where each carrier is located. Because asymmetric carrier aggregation and symmetric carrier aggregation are supported, it is required that there must be downlink carrier in the aggregated carriers, but there may be no uplink carrier. Moreover, there must be Physical Downlink Control Channel (PDCCH) and PUCCH for the PCC cell, and the PUCCH is only for the PCC cell, while there may be the PDCCH for other SCC cells.

Activation, deactivation, addition and deletion of SCC require certain delay, which may lead to interruption in transmission of the terminal device.
HO with PScell When a PCell handover is performed, a PSCell can be added quickly. This procedure is called an HO with PScell procedure. The fast CA or DC establishment can be realized through this procedure, thus improving the data transmission capability and the cell throughput of the terminal device.

Figure 4:
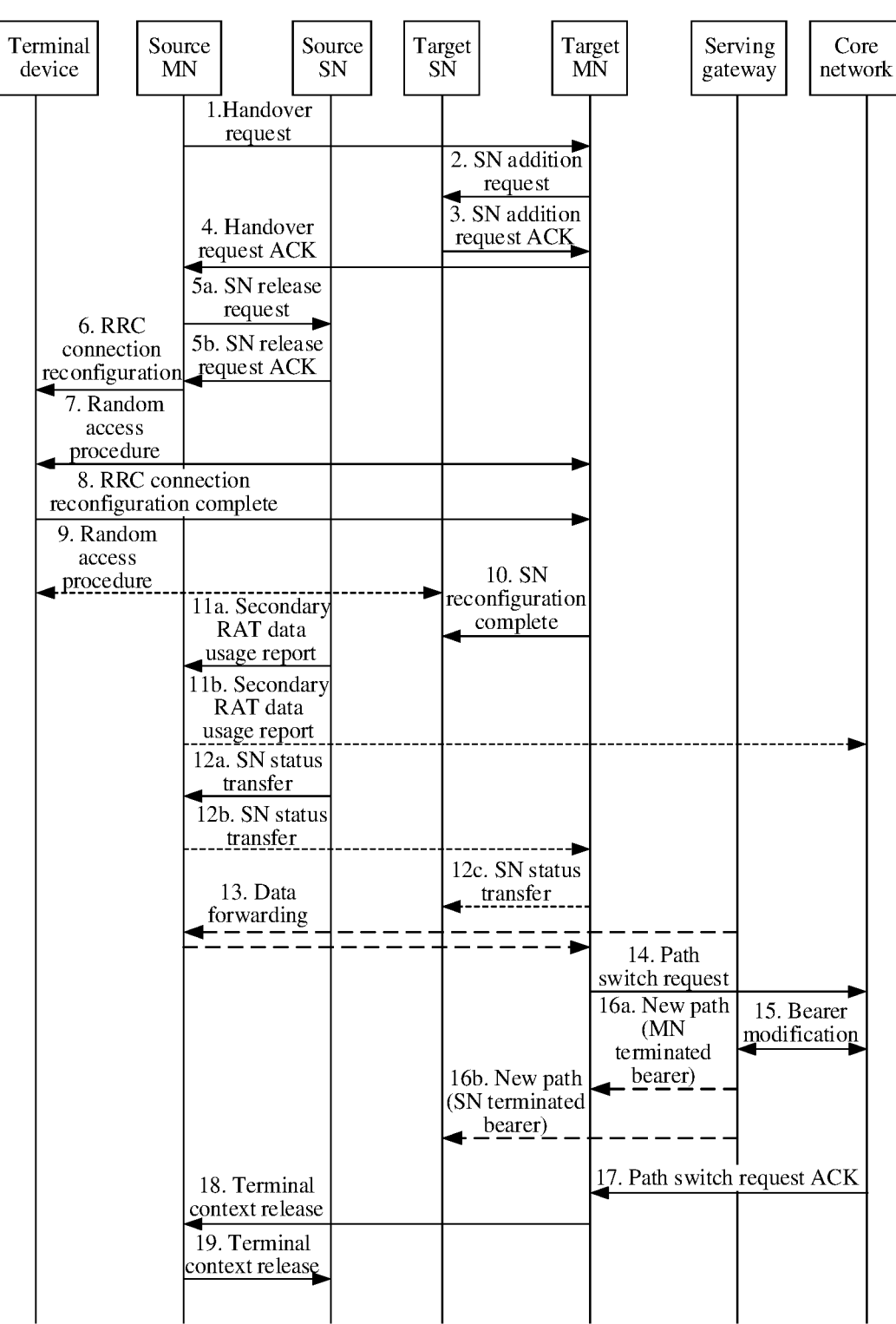
FIG. 4 is a flowchart of an HO with PScell provided by an embodiment of the present disclosure.

Referring to FIG. 4, FIG. 4 is a flowchart of an HO with PScell provided by an embodiment of the present disclosure. The flowchart mainly includes the following operations.

1. The source MN transmits a handover request message to the target MN.
2. The target MN transmits an SN addition request message to the target SN.
3. The target SN transmits an SN addition request ACK message to the target MN.
4. The target MN transmits a handover request ACK message to the source MN.
5a. The source MN transmits an SN release request message to the source SN.
5b. The source SN transmits an SN release request ACK message to the source MN.
6. The source MN transmits an RRC connection reconfiguration message to the terminal device.

Here, the RRC connection reconfiguration message is carried in the handover command.

7. The terminal device initiates a random access procedure to the target MN.
8. The terminal device transmits the RRC connection reconfiguration complete message to the target MN.
9. The terminal device initiates a random access procedure to the target SN.
10. The target MN transmits an SN reconfiguration completion message to the target SN.
11a. The source SN transmits a secondary Radio Access Technology (RAT) data usage report to the source MN.
11b. The source MN transmits the secondary RAT data usage report to the core network.
12a. The source SN performs SN status transfer to the source MN.
12b. The source MN performs SN status transfer to the target MN.
12c. The target MN performs SN status transfer to the target SN.
13. The serving gateway transmits data to the source MN, and the source MN forwards the data to the target MN.
14. The target MN transmits path switch request to the core network.
15. The bearer modification is performed between the core network and the serving gateway.
16a. The serving gateway transmits a new path to the target MN, the new path corresponds to the MN terminated bearer.
16b. The serving gateway transmits a new path to the target SN, the new path corresponds to the SN terminated bearer.
17. The core network transmits a path switch request ACK message to the target MN.
18. The target MN notifies the source MN to release the terminal context.
19. The source MN notifies the source SN to release the terminal context.

It should be noted that in the embodiments of the present disclosure, the PCell handover may also be understood as the MN handover, and the PSCell addition may also be understood as the SN addition.

In the above operations, the operations involved in PCell handover procedure mainly include the operations 7 and 8. The operations involved in the PSCell addition procedure mainly include the operations 9 and 10. The execution sequence of PCell handover procedure and PSCell addition procedure is uncertain, that is, the timeline of operations 7 and 8, and operations 9 and 10 is uncertain. In addition, the implementation requirements (such as delay requirement and interruption requirement) for PCell handover procedure and PSCell addition procedure are also uncertain.

Combined with the flows shown in FIG. 4, the starting point of the HO with PSCell procedure may be understood as the time point when the terminal device receives the handover command, and then the terminal device starts to perform the PCell handover procedure and the PSCell addition procedure. In the example given in FIG. 4, the PCell handover procedure is performed first and then the PSCell addition procedure is performed, and the time point (i.e., operation 8) when the PCell handover procedure is completed is earlier than the time point (i.e., operation 10) when the PSCell addition procedure is completed. However, the execution sequence of PCell handover procedure and PSCell addition procedure is not limited to this. How to define the execution sequence of PCell handover procedure and PSCell addition procedure needs to be solved. In addition, the implementation requirements (such as delay requirement and interruption requirement) for the PCell handover procedure and the PSCell addition procedure are also uncertain. Therefore, the following technical solutions of the embodiments of the present disclosure are proposed.

In order to facilitate understanding of the technical solutions of the embodiments of the present disclosure, the technical solutions of the present disclosure will be described in detail below by way of specific embodiments. The above related technologies as alternative solutions may be arbitrarily combined with the technical solutions of the embodiments of the present disclosure, all of which belong to the protection scope of the embodiments of the present disclosure. Embodiments of the present disclosure include at least some of the following contents.

FIG. 5 is a schematic flowchart of a method for cell handover provided by an embodiment of the present disclosure. As shown in FIG. 5, the method for cell handover includes the following operations.

In operation 501, a terminal device determines a capability of the terminal device. The capability includes support or nonsupport for processing a first procedure and a second procedure in parallel. The first procedure is associated with a PCell handover, and the second procedure is associated with a PSCell addition.

In operation 502, the terminal device performs the first procedure and the second procedure based on the capability.

In the embodiments of the present disclosure, the first procedure includes a part or all of the PCell handover procedure, and the second procedure includes a part or all of the PSCell addition procedure.

In some alternative implementations, the first procedure includes at least one of a synchronization procedure of the PCell or a random access procedure of the PCell.

In some alternative implementations, the second procedure includes at least one of: a synchronization procedure of the PSCell or a random access procedure of the PSCell.

The technical solutions of the embodiments of the present disclosure may, but are not limited to, be applied to the HO with PScell procedure. Taking the HO with PSCell procedure as an example, the first procedure may be the PCell handover procedure (e.g. operations 7 and 8 in FIG. 4) and the second procedure may be the PSCell addition procedure (e.g. operations 9 and 10 in FIG. 4). By way of example, the first procedure may be the random access procedure of the PCell (e.g. operation 7 in FIG. 4) in the PCell handover procedure, and the second procedure may be the random access procedure of the PSCell (e.g. operation 9 in FIG. 4) in the PSCell addition procedure.

In the embodiments of the present disclosure, the execution modes of the first procedure and the second procedure include the following two modes.

Mode 1: Serial Mode

Here, the terminal device performs the first procedure and the second procedure in serial.

In some alternative implementations, the first procedure is the synchronization procedure of the PCell and the second procedure is the synchronization procedure of the PSCell. The terminal device may perform the synchronization procedure of the PCell and the synchronization procedure of the PSCell in serial in the following modes.

Mode A) After performing the synchronization procedure to the PCell, the terminal device performs the synchronization procedure to the PSCell.

Mode B) The terminal device performs the synchronization procedure to the PCell. Then, if the PCell and the PSCell are in a same band or a same Frequency Range (FR), the terminal device obtains the synchronization to the PSCell based on the synchronization information of the PCell. Alternatively, if the PCell and the PSCell are in different bands or different FRs, the terminal device performs the synchronization procedure to the PSCell.

In some alternative implementations, the first procedure is the random access procedure of the PCell and the second procedure is the random access procedure of the PSCell. The terminal device may perform the random access procedure of the PCell and the random access procedure of the PSCell in serial in the following mode.

After performing the random access procedure to the PCell, the terminal device performs the random access procedure to the PSCell.

Mode 2: Parallel Mode

Here, the terminal device performs the first procedure and the second procedure in parallel.

In some alternative implementations, the first procedure is the synchronization procedure of the PCell and the second procedure is the synchronization procedure of the PSCell. The terminal device may perform the synchronization procedure of PCell and the synchronization procedure of PSCell in parallel in the following mode.

The terminal device performs the synchronization procedure to the PCell and the synchronization procedure to the PCell in parallel.

In some alternative implementations, the first procedure is the random access procedure of the PCell and the second procedure is the random access procedure of the PSCell. The terminal device may perform the random access procedure of the PCell and the random access procedure of the PSCell in parallel in the following mode.

The terminal device performs the random access procedure to the PCell and the random access procedure to the PSCell in parallel.

It should be noted that "perform in parallel" means that the execution sequence of two procedures does not affect each other.

In the embodiments of the present disclosure, the terminal device determines a capability of the terminal device, the capability includes support or nonsupport for processing the first procedure and the second procedure in parallel, and the terminal device performs the first procedure and the second procedure based on the capability.

Here, "process the first procedure and the second procedure in parallel" may also be understood as "process the first procedure and the second procedure simultaneously".

In the embodiments of the present disclosure, the capability is associated with at least one of: a type of the terminal device, a band combination supported by the terminal device, a first band in which the PCell is located, or a second band in which the PSCell is located.

In some alternative implementations, the capability is associated with the type of the terminal device. In other words, the capability is the capability of per UE. Different types of terminal devices correspond to different capabilities. Based on this, the terminal device determines the capability of the terminal device based on the type of the terminal device. In the concrete implementation, a new terminal capability (i.e., UE capability) may be introduced, which is the capability of per UE, and which is used to characterize whether a terminal device with a specific type supports processing the first procedure and the second procedure in parallel. Alternatively, the correspondence between the types of terminal devices and capabilities may be predefined by a protocol or configured by a network device.

As an example, Table 1 below shows a correspondence between the types of terminal devices and capabilities.

TABLE 1

| Does the terminal device support processing the first procedure and the second procedure in parallel | Type of the terminal device |
|---|---|
| Yes | type1 |
| No | type2 |
| Yes | type3 |

In some alternative implementations, the capability is associated with a band combination supported by the terminal device. In other words, the capability is the capability of per band combination. Different band combinations correspond to different capabilities. Based on this, the terminal device determines the capability of the terminal device based on the band combination supported by the terminal device. In the concrete implementation, a new terminal capability (i.e., UE capability) may be introduced, which is the capability of per band combination, and which is used to characterize whether the terminal device supporting a specific band combination supports processing the first procedure and the second procedure in parallel. Alternatively, an existing terminal capability (e.g. a capability of simultaneous TX) is used, which is used to characterize whether the terminal device supporting a specific band combination supports processing the first procedure and the second procedure in parallel. Alternatively, the correspondence between band combinations and capabilities may be predefined by a protocol or configured by a network device.

As an example, Table 2 below shows a correspondence between band combinations and capabilities.

TABLE 2

| Does the terminal device support processing the first procedure and the second procedure in parallel | Band combination supported by the terminal device | |
| --- | --- | --- |
| Yes | Band 1 | Band 2 |
| No | Band 1 | Band 3 |
| Yes | Band 2 | Band 3 |

In some alternative implementations, the capability is associated with a first band in which the PCell is located and a second band in which the PSCell is located, the first band and the second band form a band combination. That is, the capability is the capability of per band combination. Different band combinations correspond to different capabilities. Based on this, the terminal device determines the capability of the terminal device based on the first band in which the PCell is located and the second band in which the PSCell is located. In the concrete implementation, a new terminal capability (i.e., UE capability) may be introduced, which is the capability of per band combination, and which is used to characterize whether the terminal device supports processing the first procedure and the second procedure in parallel for the PCell and PSCell corresponding to a specific band combination. Alternatively, the correspondence between band combinations and capabilities may be predefined by a protocol or configured by a network device.

As an example, Table 3 below shows a correspondence between band combinations and capabilities.

TABLE 3

| Does the terminal device support processing the first procedure and the second procedure in parallel | The first band in which the PCell is located | The second band in which the PSCell is located |
| --- | --- | --- |
| Yes | Band 1 | Band 2 |
| No | Band 1 | Band 3 |
| Yes | Band 2 | Band 3 |

In some alternative implementations, if the first band in which the PCell is located and the second band in which the PSCell is located belong to different bands or different FRs, the terminal device determines that the terminal device does not support processing the first procedure and the second procedure in parallel. If the first band in which the PCell is located and the second band in which the PSCell is located belong to a same band or a same FR, the terminal device determines that the terminal device supports processing the first procedure and the second procedure in parallel.

In some alternative implementations, if the first band in which the PCell is located and the second band in which the PSCell is located belong to different bands or different FRs, the terminal device determines that the terminal device does not support processing the first procedure and the second procedure in parallel. If the first band in which the PCell is located and the second band in which the PSCell is located belong to the same band or same FR, the terminal device determines the capability of the terminal device based on the type of the terminal device.

In the embodiments of the present disclosure, if the capability of the terminal device indicates that the terminal device does not support processing the first procedure and the second procedure in parallel, the terminal device performs the first procedure and the second procedure in serial.

If the capability of the terminal device indicates that the terminal device supports processing the first procedure and the second procedure in parallel, the terminal device performs the first procedure and the second procedure in parallel.

In some alternative implementations, the capability of the terminal device may be applied to any of the following segments:

cell search, fine time tracking, terminal processing time (UE processing time), time for interruption uncertainty in acquiring the first available PRACH occasion in the new cell, and time for Synchronization Signal Block (SSB) post-processing.

In one example, the capability of the terminal device is applied to the segment of "terminal processing time". The terminal processing time includes at least software processing time and/or RF warm up time. In a case that the terminal device performs the first procedure and the second procedure in serial, the total terminal processing time for the first procedure and the second procedure is the terminal processing time corresponding to the first procedure plus the terminal processing time corresponding to the second procedure. In a case that the terminal device performs the first procedure and the second procedure in parallel, the total terminal processing time for the first procedure and the second procedure is a maximum of the terminal processing time corresponding to the first procedure and the terminal processing time corresponding to the second procedure.

For example, in a case that the PCell procedure and the PSCell addition procedure are performed in serial, the total terminal processing time is the terminal processing time corresponding to the PCell procedure plus the terminal processing time corresponding to the PSCell addition procedure.

For example, in a case that the PCell procedure and the PSCell addition procedure are performed in parallel, the total terminal processing time is the maximum of the terminal processing time corresponding to the PCell procedure and the terminal processing time corresponding to the PSCell addition procedure.

In one example, the capability of the terminal device is applied to the segment of "time for interruption uncertainty in acquiring the first available PRACH occasion in the new cell". In a case that the terminal device performs the first procedure and the second procedure in serial, the first time for the first procedure and the second procedure is: a time when the terminal device transmits a preamble to the PSCell. The first time is a time related to a delay requirement. In a case that the terminal device performs the first procedure and the second procedure in parallel, a first time for the first procedure and the second procedure is: a later time between a time when the terminal device transmits a preamble to the PCell and a time when the terminal device transmits the preamble to the PSCell. The first time is a time related to the delay requirement.

For example, in a case that the PCell procedure and the PSCell addition procedure are performed in serial, the ending point related to delay requirement is the time when the terminal device transmits the preamble to the PSCell. Here, the PSCell refers to the target PSCell during the PSCell addition procedure.

For example, in a case that the PCell procedure and the PSCell addition procedure are performed in parallel, the ending point related to the delay requirement is the later time between the time when the terminal device transmits the preamble to the PCell and the time when terminal device transmits the preamble to the PSCell. Here, the PCell refers to the target PCell in the PCell handover procedure, and the PSCell refers to the target PSCell in the PSCell addition procedure.

In an example, for PCell handover procedure and PSCell addition procedure, if the two segments of the random access procedure and the terminal processing procedure are not considered, other segments may be performed in parallel. It should be noted that the time corresponding to the terminal processing procedure refers to the terminal processing time (i.e. Tprocessing).

In some alternative implementations, the parallel processing of the segments other than the random access procedure and the terminal processing procedure may not be limited by the capability of the terminal device. That is, the segments other than the random access procedure and the terminal processing procedure may be performed in parallel regardless of the capability of the terminal device. Further, alternatively, the terminal device may process other segments other than the random access procedure and the terminal processing procedure in parallel if at least one of the following conditions is met.

First condition: The PSCell is unknown to the terminal device and there is no SSB and its measurement window (i.e. SSB Measurement Timing Configuration (SMTC) window) configured for the PSCell. The PSCell refers to the target PSCell in PSCell handover.

Second condition: The PCell and the PSCell are configured with different SMTCs. When this condition is met and other segments are performed in parallel, the SMTCs adopted by other segments are the SMTCs with longest period among all configured SMTCs.

Third condition: It is assumed that the parallel processing is always performed.

In the embodiments of the present disclosure, in a case that the terminal device processes the first procedure and the second procedure in parallel, the delay requirement corresponding to the terminal device is the first delay requirement. In a case that the terminal device processes the first procedure and the second procedure in serial, the delay requirement corresponding to the terminal device is the second delay requirement. The first delay requirement is different from the second delay requirement.

Alternatively, the time corresponding to the first delay requirement is shorter than the time corresponding to the second delay requirement. The first delay requirement may also be called a parallel delay requirement or a short delay requirement, and the second delay requirement may also be called a serial delay requirement or a long delay requirement.

In some alternative implementations, the first delay requirement and the second delay requirement are delay requirements for one of:

the first procedure;
the second procedure;
a part of the first procedure;
a part of the second procedure; or
a total procedure of the first procedure and the second procedure.

By way of example, the first delay requirement and the second delay requirement are delay requirements for the PCell handover procedure.

By way of example, the first delay requirement and the second delay requirement are delay requirements for the PSCell addition procedure.

By way of example, the first delay requirement and the second delay requirement are delay requirements for the random access procedure of the PCell.

By way of example, the first delay requirement and the second delay requirement are delay requirements for the random access procedure of the PSCell.

By way of example, the first delay requirement and the second delay requirement are delay requirements for a total procedure of the PCell handover procedure and the PSCell addition procedure.

In some alternative implementations, at least one of the first delay requirement or the second delay requirement is preconfigured by a protocol, or configured by the network device through the first indication information.

In some alternative implementations, at least one of the first delay requirement or the second delay requirement is determined based on the terminal capability reported by the terminal device in the case that at least one of the first delay requirement or the second delay requirement is configured by the network device through the first indication information. Alternatively, the terminal capability is associated with at least one of: a type of the terminal device, a band combination supported by the terminal device, and whether the terminal device supports processing the first procedure and the second procedure in parallel.

In some alternative implementations, the terminal device reports capability indication information. The capability indication information indicates the capability of the terminal device or a delay requirement supported by the terminal device.

In some alternative implementations, if the capability indication information indicates that the terminal device supports processing the first procedure and the second procedure in parallel or the terminal device supports the first delay requirement, the terminal device determines that the PCell is not allowed to generate an interruption request; or
the terminal device determines that the interruption request generated by the PCell is a specified interruption request.

Alternatively, the specified interruption request may be the minimum of a plurality of candidate interruption requests. The specified interruption request may also be called a minimum interruption request.

In some alternative implementations, if the capability indication information indicates that the terminal device does not support processing the first procedure and the second procedure in parallel, or indicates that the terminal device supports processing the first procedure and the second procedure in serial, or indicates that the terminal device supports the second delay requirement, the terminal device determines that the PCell is allowed to generate an interruption request.

In some alternative implementations, the interruption request is preconfigured by a protocol or configured by the network device through the second indication information in the aforementioned solutions.

In some alternative implementations, the interruption request is determined based on the terminal capability reported by the terminal device in the case that the interruption request is configured by a network device through second indication information. In some alternative implementations, the terminal capability is associated with at least one of: a type of the terminal device, a band combination supported by the terminal device, or whether the terminal device supports processing the first procedure and the second procedure in parallel.

In the above scheme, the time corresponding to the interruption request is represented by a certain number of time units, and the time units are slots or milliseconds. In a case that the time units are the slots, a length of the time units is related to the subcarrier spacing of the PSCell, or a length of the time units is related to the subcarrier spacings of the PSCell and the PCell. For example, the length of the time unit is related to the minimum subcarrier spacing of the PSCell and the PCell.

In one example, the PCell is not allowed to generate an interruption request in the case that the first procedure and the second procedure are processed in parallel. For example, if the PCell handover procedure is completed first, the PSCell addition procedure cannot affect the normal scheduling of PCell. That is, the scheduling of PCell will not be interrupted, or it may be understood that the interruption is not generated for the PCell.

In one example, the PCell is allowed to generate an interruption request in the case that the first procedure and the second procedure are processed in serial. For example, after the PCell handover procedure is completed, the PSCell addition procedure will affect the normal scheduling of PCell. That is, the scheduling of PCell will be interrupted, or it may be understood that the interruption is generated for the PCell.

In one example, the interruption request of PCell is determined based on the terminal capability. The terminal capability is associated with at least one of: a type of the terminal device, a band combination supported by the terminal device, or whether the terminal device supports processing the first procedure and the second procedure in parallel. For example, the band combination supported by terminal device is {band 1, band 2}, and the corresponding interruption request is zero slot. The band combination supported by UE is {band 3, band 4}, and the corresponding interrupt request is one slot. The band combination supported by terminal device is {band 1, band 4}, and the corresponding interruption request is two slots. For example, the terminal device supports processing the first procedure and the second procedure in parallel, and the corresponding interruption request is zero slot. The terminal device supports processing the first procedure and the second procedure in serial, and the corresponding interruption request is one slot.

In the technical solutions of the embodiments of the present disclosure, whether the two procedures can be performed in parallel is analyzed from the point of view of the terminal capability. In addition, the PCell handover procedure and the PSCell addition procedure need a certain amount of time, which brings delay, so the delay requirements corresponding to parallel scenario and serial scenario are defined respectively. In addition, because the execution of PSCell addition procedure may cause interruption of the PCell, the interruption requests corresponding to parallel scenario and serial scenario are defined respectively.

In the technical solutions of the embodiments of the present disclosure, the timeline of the HO with PScell procedure is defined, furthermore, the delay requirement and the interruption request are defined in combination with the terminal capability, so that the realization of the HO with PScell procedure is more realizable.

Preferred embodiments of the present disclosure have been described in detail with reference to the drawings, but the present disclosure is not limited to the specific details of the above embodiments. Within the scope of the technical conception of the present disclosure, various simple modifications can be made to the technical solutions of the present disclosure, and these simple modifications all belong to the scope of protection of the present disclosure. For example, various specific technical features described in the above specific embodiments may be combined in any suitable manner without contradiction, and various possible combinations are not further described in the present disclosure in order to avoid unnecessary repetition. For another example, any combination may be made between the various different embodiments of the present disclosure, so long as it does not depart from the idea of the present disclosure. It is likewise to be regarded as the contents of the present disclosure. For another example, on the premise of no conflict, various embodiments described in the present disclosure and/or the technical features in various embodiments can be arbitrarily combined with the prior art, and the technical solutions obtained after combination should also fall within the scope of protection of the present disclosure.

It should also be understood that in the various method embodiments of the present disclosure, the size of the sequence number of the above processes does not mean the execution sequence, and the execution sequence of the processes should be determined by their functions and inherent logic, and should not be defined in any way by the implementation process of the embodiments of the present disclosure. Further, in embodiments of the present disclosure, the terms "downlink", "uplink" and "sidelink" are used to denote transmission directions of signals or data. The "downlink" is used to denote a first direction of transmission of signals or data from a site to an UE of a cell. The "uplink" is used to denote a second direction of transmission of signals or data from an UE of a cell to a site. The "sidelink" is used to denote a third direction of transmission of signals or data from an UE 1 to an UE 2. For example, "downlink signal" means that the transmission direction of the signal is the first direction. In addition, in embodiments of the present disclosure, the term "and/or" is merely an association relationship that describes associated objects, which indicates that there may be three relationships. Specifically, "A and/or B" may represent three situations: A exists alone, A and B exist simultaneously, and B exists alone. In addition, the character "/" in the present disclosure generally indicates that there is "or" relationship between objects associated before and after.

FIG. 6 is a schematic diagram of a structure composition of an apparatus for cell handover provided by an embodiment of the present disclosure. As shown in FIG. 6, the apparatus for cell handover includes a determining unit 601 and a performing unit 602.

The determining unit 601 is configured to determine a capability of the terminal device, the capability including support or nonsupport for processing a first procedure and a second procedure in parallel, the first procedure being associated with a PCell handover, and the second procedure being associated with a PSCell addition.

The performing unit 602 is configured to perform the first procedure and the second procedure based on the capability.

In some alternative implementations, the capability is associated with at least one of:

a type of the terminal device, a band combination supported by the terminal device, a first band in which a PCell is located, or a second band in which a PSCell is located.

In some alternative implementations, the determining unit 601 is configured to determine the capability of the terminal device based on the type of the terminal device.

In some alternative implementations, the determining unit 601 is configured to determine the capability of the terminal device based on the band combination supported by the terminal device.

In some alternative implementations, the determining unit 601 is configured to determine the capability of the terminal device based on the first band in which the PCell is located and the second band in which the PSCell is located.

In some alternative implementations, the determining unit 601 is configured to determine that the terminal device does not support processing the first procedure and the second procedure in parallel in response to the first band in which the PCell is located and the second band in which the PSCell is located belonging to different bands or different FRs, and determine that the terminal device supports processing the first procedure and the second procedure in parallel in response to the first band in which the PCell is located and the second band in which the PSCell is located belonging to a same band or a same FR.

In some alternative implementations, the determining unit 601 is configured to determine that the terminal device does not support processing the first procedure and the second procedure in parallel in response to the first band in which the PCell is located and the second band in which the PSCell is located belonging to different bands or different FRs, and determine the capability of the terminal device based on the type of the terminal device in response to the first band in which the PCell is located and the second band in which the PSCell is located belonging to a same band or a same FR.

In some alternative implementations, the first procedure includes a part or all of the PCell handover procedure and the second procedure includes a part or all of the PSCell addition procedure.

In some alternative implementations, the first procedure includes at least one of:

a synchronization procedure of the PCell; or a random access procedure of the PCell.

In some alternative implementations, the second procedure includes at least one of:

a synchronization procedure of the PSCell; or a random access procedure of the PSCell.

In some alternative implementations, the performing unit 602 is configured to perform the first procedure and the second procedure in serial in response to the capability of the terminal device indicating that the terminal device does not support processing the first procedure and the second procedure in parallel; and perform the first procedure and the second procedure in parallel in response to the capability of the UE indicating that the UE supports processing the first procedure and the second procedure in parallel.

In some alternative implementations, in a case that the terminal device performs the first procedure and the second procedure in serial, a total terminal processing time for the first procedure and the second procedure is a terminal processing time corresponding to the first procedure plus a terminal processing time corresponding to the second procedure.

In some alternative implementations, in a case that the terminal device performs the first procedure and the second procedure in parallel, a total terminal processing time for the first procedure and the second procedure is a maximum of a terminal processing time corresponding to the first procedure and a terminal processing time corresponding to the second procedure.

In some alternative implementations, in a case that the terminal device performs the first procedure and the second procedure in serial, a first time for the first procedure and the second procedure is: a time when the terminal device transmits a preamble to the PSCell.

The first time is a time related to a delay requirement.

In some alternative implementations, in a case the terminal device performs the first procedure and the second procedure in parallel, a first time for the first procedure and the second procedure is: a later time between a time when the terminal device transmits a preamble to the PCell and a time when the terminal device transmits the preamble to the PSCell.

The first time is a time related to a delay requirement.

In some alternative implementations, the operation of performing the first procedure and the second procedure in serial includes the following operation.

A synchronization procedure to the PSCell is performed after performing the synchronization procedure to the PCell.

In some alternative implementations, the operation of performing the first procedure and the second procedure in serial includes the following operations.

A synchronization procedure to the PCell is performed.

In response to the PCell and the PSCell belonging to a same band or a same FR, a synchronization to the PSCell is obtained based on synchronization information of the PCell.

In response to the PCell and the PSCell belonging to different bands or different FRs, a synchronization procedure to the PSCell is performed.

In some alternative implementations, the operation of performing the first procedure and the second procedure in parallel includes the following operation.

A synchronization procedure to the PCell and a synchronization procedure to the PCell are performed in parallel.

In some alternative implementations, in a case that the performing unit 602 processes the first procedure and the second procedure in parallel, a delay requirement corresponding to the terminal device is a first delay requirement.

In a case that the performing unit 602 processes the first procedure and the second procedure in serial, a delay requirement corresponding to the terminal device is a second delay requirement.

The first delay requirement is different from the second delay requirement.

In some alternative implementations, the first delay requirement and the second delay requirement are delay requirements for one of:

the first procedure;

the second procedure;

a part of the first procedure;

a part of the second procedure; or a total procedure of the first procedure and the second procedure.

In some alternative implementations, at least one of the first delay requirement or the second delay requirement is preconfigured by a protocol, or configured by a network device through the first indication information.

In some alternative implementations, at least one of the first delay requirement or the second delay requirement is determined based on a terminal capability reported by the terminal device in the case that at least one of the first delay requirement or the second delay requirement is configured by the network device through the first indication information.

In some alternative implementations, the apparatus further includes a sending unit.

The sending unit is configured to report capability indication information, the capability indication information indicating the capability of the terminal device.

In some alternative implementations, the determining unit 601 is further configured to: in response to the capability indication information indicating that the terminal device supports processing the first procedure and the second procedure in parallel, determine that the PCell is not allowed to generate an interruption request; or determine that the interruption request generated by the PCell is a specified interruption request.

In some alternative implementations, the determining unit 601 is further configured to: in response to the capability indication information indicating that the terminal device does not support processing the first procedure and the second procedure in parallel, determine that the PCell is allowed to generate an interruption request.

In some alternative implementations, the interruption request is preconfigured by a protocol or configured by a network device through second indication information.

In some alternative implementations, the interruption request is determined based on a terminal capability reported by the terminal device in a case that the interruption request is configured by a network device through second indication information.

In some alternative implementations, the terminal capability is associated with at least one of:

a type of the terminal device, a band combination supported by the terminal device, or whether the terminal device supports processing the first procedure and the second procedure in parallel.

In some alternative implementations, a time corresponding to the interruption request is represented by a number of time units, the time units are slots or milliseconds.

In some alternative implementations, in a case that the time units are the slots, a length of the time units is related to a subcarrier spacing of the PSCell, or a length of the time units is related to subcarrier spacings of the PSCell and the PCell.

Those skilled in the art will appreciate that the related description of the above apparatus for cell handover in the embodiments of the present disclosure may be understood with reference to the related description of the method for cell handover in the embodiments of the present disclosure.

FIG. 7 is a schematic structural diagram of a communication device 700 provided by an embodiment of the present disclosure. The communication device may be a terminal device or a network device. The communication device 700 shown in FIG. 7 includes a processor 710. The processor 710 may invoke and execute a computer program in a memory to implement the methods in the embodiments of the present disclosure.

Alternatively, as shown in FIG. 7, the communication device 700 may further include a memory 720. The processor 710 may invoke and execute a computer program in the memory 720 to implement the methods in embodiments of the present disclosure.

The memory 720 may be a separate device independent of the processor 710 or may be integrated in the processor 710.

Alternatively, as shown in FIG. 7, the communication device 700 may further include a transceiver 730. The processor 710 may control the transceiver 730 to communicate with other devices, and in particular, to transmit information or data to or receive information or data transmitted by other devices.

The transceiver 730 may include a transmitter and a receiver. Transceiver 730 may further include antennas, the number of which may be one or more.

Alternatively, the communication device 700 may be specifically a network device in the embodiments of the present disclosure, and the communication device 700 may implement corresponding processes implemented by the network device in various methods of the embodiments of the present disclosure, which will not be repeated here for the sake of brevity.

Alternatively, the communication device 700 may be specifically a mobile terminal/terminal device in the embodiments of the present disclosure, and the communication device 700 may implement corresponding processes implemented by the mobile terminal/terminal device in various methods of the embodiments of the present disclosure, which will not be repeated here for the sake of brevity.

Figure 8:
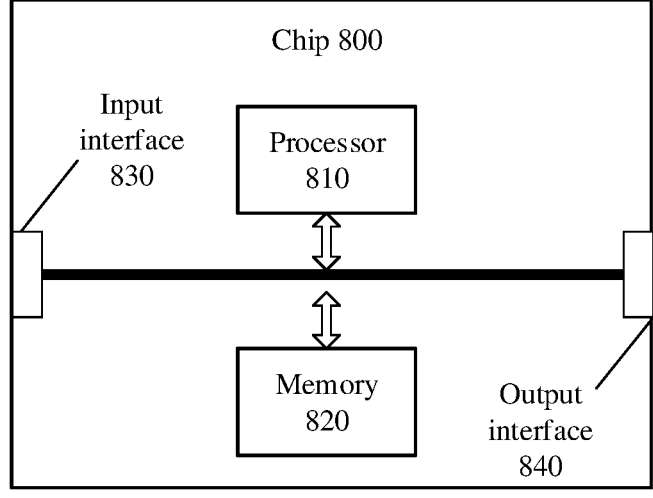
FIG. 8 is a schematic structural diagram of a chip according to an embodiment of the present disclosure.

FIG. 8 is a schematic structural diagram of a chip according to an embodiment of the present disclosure. The chip 800 shown in FIG. 8 includes a processor 810. The processor 810 may invoke and execute a computer program in a memory to implement the methods in the embodiments of the present disclosure.

Alternatively, as shown in FIG. 8, the chip 800 may further include a memory 820. The processor 810 may invoke and execute a computer program in the memory 820 to implement the methods in embodiments of the present disclosure.

The memory 820 may be a separate device independent of the processor 810 or may be integrated in the processor 810.

Alternatively, the chip 800 may further include an input interface 830. The processor 810 may control the input interface 830 to communicate with other devices or chips, and in particular, to obtain information or data transmitted by other devices or chips.

Alternatively, the chip 800 may further include an output interface 840. The processor 810 may control the output interface 840 to communicate with other devices or chips, and in particular, to output information or data to other devices or chips.

Alternatively, the chip may be applied to the network device in the embodiments of the present disclosure, and the chip may implement the corresponding processes implemented by the network device in various methods of the embodiments of the present disclosure, which will not repeated here for the sake of brevity.

Alternatively, the chip may be applied to the mobile terminal/terminal device in the embodiments of the present disclosure, and the chip may implement corresponding processes implemented by the mobile terminal/terminal device in various methods of the embodiments of the present disclosure, which will not be repeated here for the sake of brevity.

It should be understood that the chips referred to in embodiments of the present disclosure may also be referred to as system level chip, system chip, chip system or system-on-chip or the like.

Figure 9:
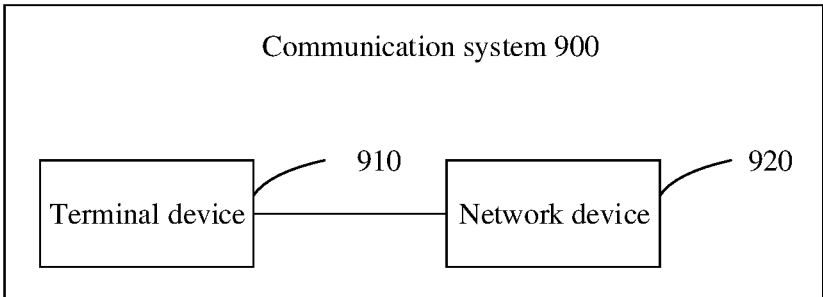
FIG. 9 is a schematic block diagram of a communication system provided by an embodiment of the present disclosure.

FIG. 9 is a schematic block diagram of a communication system 900 provided by an embodiment of the present disclosure. As shown in FIG. 9, the communication system 900 includes a terminal device 910 and a network device 920.

The terminal device 910 may be used to implement the corresponding functions implemented by the terminal device in the above methods, and the network device 920 may be used to implement the corresponding functions implemented by the network device in the above methods, which will not be repeated here for the sake of brevity.

It should be understood that the processor of the embodiments of the present disclosure may be an integrated circuit chip having signal processing capability. In implementation, the various steps of the above method embodiments may be accomplished by integrated logic circuitry of hardware in the processor or instructions in the form of software. The above processor may be a general purpose processor, a Digital Signal Processor (DSP), an Application Specific Integrated Circuit (ASIC), a Field Programmable Gate Array (FPGA) or other programmable logic devices, discrete gates or transistor logic devices, or discrete hardware components. The methods, steps and logic block diagrams disclosed in embodiments of the present disclosure may be implemented or performed. The general purpose processor may be a microprocessor or the processor may be any conventional processor or the like. The steps of the method disclosed in combination with the embodiments of the present disclosure may be directly embodied as the execution of the hardware decoding processor or the combined execution of the hardware and software modules in the decoding processor. The software modules may be located in random memory, flash memory, read-only memory, programmable read-only memory or electrically erasable programmable memory, registers and other storage medium mature in the art. The storage medium is located in the memory, and the processor reads the information in the memory and completes the steps of the method in combination with its hardware.

It is understood that the memory in embodiments of the present disclosure may be volatile memory or non-volatile memory, or may include both volatile and non-volatile memory. The non-volatile memory may be Read-Only Memory (ROM), Programmable ROM (PROM), Erasable PROM (EPROM), Electrically EPROM (EEPROM), or flash memory. The volatile memory may be a Random Access Memory (RAM) which serves as an external cache. By way of illustration, but not limitation, many forms of RAM are available, such as static RAM (SRAM), Dynamic RAM (DRAM), Synchronous DRAM (SDRAM), Double Data Rate SDRAM (DDR SDRAM), Enhanced SDRAM (ESDRAM), Synchlink DRAM (SLDRAM), and Direct Rambus RAM (DR RAM). It should be noted that the memory of the systems and methods described herein is intended to include but not limited to these and any other suitable types of memory.

It should be understood that the memory described above is exemplary, but not limiting, and, for example, the memory in embodiments of the present disclosure may also be an SRAM, a DRAM, an SDRAM, a DDR SDRAM, an ESDRAM, a SLDRAM, a DR RAM, etc. That is, the memory in embodiments of the present disclosure is intended to include but not limited to these and any other suitable types of memory.

The embodiments of the present disclosure further provide a computer-readable storage medium for storing a computer program.

Alternatively, the computer-readable storage medium may be applied to the network device in the embodiments of the present disclosure, and the computer program causes the computer to perform the corresponding processes implemented by the network device in the various methods of the embodiments of the present disclosure, which will not be repeated here for the sake of brevity.

Alternatively, the computer-readable storage medium may be applied to the mobile terminal/terminal device in the embodiments of the present disclosure, and the computer program causes the computer to perform corresponding processes implemented by the mobile terminal/terminal device in the various methods of the embodiments of the present disclosure, which will not be repeated here for the sake of brevity.

The embodiments of the present disclosure further provide a computer program product including computer program instructions.

Alternatively, the computer program product may be applied to the network device in the embodiments of the present disclosure, and the computer program instructions cause the computer to perform the corresponding processes implemented by the network device in the various methods of the embodiments of the present disclosure, which will not be repeated here for the sake of brevity.

Alternatively, the computer program product may be applied to the mobile terminal/terminal device in the embodiments of the present disclosure, and the computer program instructions cause the computer to perform the corresponding processes implemented by the mobile terminal/terminal device in the various methods of the embodiments of the present disclosure, which will not repeated here for the sake of brevity.

The embodiments of the present disclosure further provide a computer program.

Alternatively, the computer program may be applied to the network device in the embodiments of the present disclosure, and when the computer program is run on the computer, the computer performs the corresponding processes implemented by the network device in the various methods of the embodiments of the present disclosure, which will not be repeated here for the sake of brevity.

Alternatively, the computer program may be applied to the mobile terminal/terminal device in the embodiments of the present disclosure, and when the computer program is run on the computer, the computer performs the corresponding processes implemented by the mobile terminal/terminal device in the various methods of the embodiments of the present disclosure, which will not be repeated here for the sake of brevity.

The embodiments of the present disclosure provide a method and an apparatus for cell handover, a terminal device, a chip, a computer readable storage medium, a computer program product and a computer program.

The method for cell handover provided by the embodiments of the present disclosure includes the following operations.

The terminal device determines a capability of the terminal device. The capability includes support or nonsupport for processing a first procedure and a second procedure in parallel. The first procedure is associated with a Primary Cell (PCell) handover, and the second procedure is associated with a Primary Secondary Cell (PSCell) addition.

The terminal device performs the first procedure and the second procedure based on the capability.

The apparatus for cell handover provided by the embodiments of the present disclosure is applicable for a terminal device. The device includes a determining unit and a performing unit.

The determining unit is configured to determine a capability of the terminal device. The capability includes support or nonsupport for processing a first procedure and a second procedure in parallel. The first procedure is associated with a Primary Cell (PCell) handover, and the second procedure is associated with a Primary Secondary Cell (PSCell) addition.

The performing unit is configured to perform the first procedure and the second procedure based on the capability.

The terminal device provided by the embodiments of the present disclosure may be the first device in the above solution or the second device in the above solution. The communication device includes a processor and a memory. The memory is configured to store a computer program, and the processor is configured to invoke and execute the computer program stored in the memory to perform the above method for cell handover.

The chip provided by the embodiments of the present disclosure is configured to implement the above method for cell handover.

In particular, the chip includes a processor for invoking and running a computer program in a memory to cause a device installed with the chip to perform the above method for cell handover.

The computer readable storage medium provided by the embodiments of the present disclosure is used for storing a computer program that causes a computer to perform the above method for cell handover.

A computer program product provided by the embodiments of the present disclosure includes computer program instructions causing a computer to perform the above method for cell handover.

The computer program provided by the embodiments of the present disclosure causes a computer to perform the above method for cell handover when it is run on the computer.

In the technical solutions, the terminal device performs the first procedure and the second procedure based on the capability of the terminal device. The capability includes support or nonsupport for processing the first procedure and the second procedure in parallel. The first procedure is associated with the PCell handover and the second procedure is associated with the PSCell addition. In this way, the terminal device can reasonably perform the first procedure associated with the PCell handover and the second procedure associated with the PSCell addition in combination with its own capability, thus ensuring that the HO with PScell procedure can be effectively performed.

Those of ordinary skill in the art will appreciate that the various example units and algorithm steps described in combination with the embodiments disclosed herein may be implemented in electronic hardware or a combination of computer software and electronic hardware. Whether these functions are performed in hardware or software depends on the specific application and design constraints of the technical solutions. Skilled artisans may use different methods for each particular application to implement the described functionality, but such implementation should not be considered outside the scope of the present disclosure.

Those skilled in the art will clearly appreciate that, for convenience and conciseness of description, the specific operating processes of the above systems, apparatuses and units may refer to the corresponding processes in the aforementioned method embodiments, which will not be repeated herein.

In several embodiments provided the present disclosure, it should be understood that the disclosed systems, apparatuses and methods may be implemented in other ways. For example, the above embodiment of the apparatus is only schematic, for example, the division of the unit is only a logical function division, and in practice, there may be another division mode, for example, multiple units or components may be combined or integrated into another system, or some features may be ignored or not performed. On the other hand, the coupling or direct coupling or communication connection between each other shown or discussed may be indirect coupling or communication connection through some interface, apparatus or unit, and may be electrical, mechanical or other form.

The units illustrated as separate elements may or may not be physically separated, and the elements displayed as units may or may not be physical units, i.e. may be located in one place, or may be distributed over a plurality of network units. A part or all of the units may be selected according to the actual needs to achieve the purpose of the embodiments.

In addition, various functional units in various embodiments of the present disclosure may be integrated in one processing unit, each unit may exist physically alone, or two or more units may be integrated in one unit.

The functions may be stored in a computer readable storage medium if implemented in the form of software functional units and sold or used as stand-alone products. Based on this understanding, the technical solutions of the present disclosure may be embodied in the form of a software product in essence or contributing to the prior art or part of the technical solutions, which computer software product is stored in a storage medium and includes instructions for causing a computer device (which may be a personal computer, a server, a network device, etc.) to perform all or part of the steps of the method described in various embodiments of the present disclosure. The aforementioned storage medium includes a U disk, a removable hard disk, a ROM, a RAM, a magnetic disk or an optical disk and other medium capable of storing program codes.

The above description is only the specific embodiments of the present disclosure, but the scope of protection of the present disclosure is not limited thereto. Any person skilled in the art who is familiar with the technical filed can easily think of changes or substitutions, which should cover within the scope of protection of the present disclosure. Therefore, the protection scope of the present disclosure should be subject to the protection scope of the claims.

The invention claimed is:

1. A method for cell handover, comprising:

determining, by a terminal device, a capability of the terminal device, the capability comprising support or nonsupport for processing a first procedure and a second procedure in parallel, the first procedure being associated with a Primary Cell (PCell) handover, and the second procedure being associated with a Primary Secondary Cell (PSCell) addition;

performing, by the terminal device, the first procedure and the second procedure based on the capability;

reporting, by the terminal device, capability indication information, the capability indication information indicating the capability of the terminal device; and in response to the capability indication information indicating that the terminal device supports processing the first procedure and the second procedure in parallel, determining, by the terminal device, that a PCell is not allowed to generate an interruption request, or determining, by the terminal device, that the interruption request generated by the PCell is a specified interruption request; or in response to the capability indication information indicating that the terminal device does not support processing the first procedure and the second procedure in parallel, determining, by the terminal device, that a PCell is allowed to generate an interruption request.

2. The method of claim 1, wherein the capability is associated with at least one of:

a type of the terminal device, a band combination supported by the terminal device, a first band in which the PCell is located, or a second band in which a PSCell is located.

3. The method of claim 2, wherein determining, by the terminal device, the capability of the terminal device comprises:

in response to the first band in which the PCell is located and the second band in which the PSCell is located belonging to different bands or different Frequency Ranges (FRs), determining, by the terminal device, that the terminal device does not support processing the first procedure and the second procedure in parallel; and in response to the first band in which the PCell is located and the second band in which the PSCell is located belonging to a same band or a same FR, determining, by the terminal device, the capability of the terminal device based on the type of the terminal device.

4. The method of claim 1, wherein the first procedure comprises a part or all of a PCell handover procedure, and the second procedure comprises a part or all of a PSCell addition procedure, wherein the first procedure comprises at least one of:

a synchronization procedure of the PCell; or a random access procedure of the PCell.

5. The method of claim 1, wherein performing, by the terminal device, the first procedure and the second procedure based on the capability comprises:

in response to the capability of the terminal device indicating that the terminal device does not support processing the first procedure and the second procedure in parallel, performing, by the terminal device, the first procedure and the second procedure in serial; and in response to the capability of the terminal device indicating that the terminal device supports processing the first procedure and the second procedure in parallel, performing, by the terminal device, the first procedure and the second procedure in parallel.

6. The method of claim 5, wherein in a case that the terminal device performs the first procedure and the second procedure in serial, a total terminal processing time for the first procedure and the second procedure is a terminal processing time corresponding to the first procedure plus a terminal processing time corresponding to the second procedure; or in a case that the terminal device performs the first procedure and the second process in parallel, a total terminal processing time for the first procedure and the second procedure is a maximum of a terminal processing time corresponding to the first procedure and a terminal processing time corresponding to the second procedure.

7. The method of claim 5, wherein in a case that the terminal device processes the first procedure and the second procedure in parallel, a delay requirement corresponding to the terminal device is a first delay requirement, and in a case that the terminal device processes the first procedure and the second procedure in serial, a delay requirement corresponding to the terminal device is a second delay requirement, wherein the first delay requirement is different from the second delay requirement.

8. The method of claim 7, wherein at least one of the first delay requirement or the second delay requirement is preconfigured by a protocol, or configured by a network device through first indication information.

9. The method of claim 1, wherein the interruption request is preconfigured by a protocol or configured by a network device through second indication information.

10. A terminal device, comprising:

a processor;

a memory for storing a computer program executable by the processor; and a transceiver;

wherein the processor is configured to execute the computer program to cause the terminal device to:

determine a capability of the terminal device, the capability comprising support or nonsupport for processing a first procedure and a second procedure in parallel, the first procedure being associated with a Primary Cell (PCell) handover, and the second procedure being associated with a Primary Secondary Cell (PSCell) addition;

perform the first procedure and the second procedure based on the capability;

report capability indication information, the capability indication information indicating the capability of the terminal device; and in response to the capability indication information indicating that the terminal device supports processing the first procedure and the second procedure in parallel, determine that a PCell is not allowed to generate an interruption request, or determine that the interruption request generated by the PCell is a specified interruption request; or in response to the capability indication information indicating that the terminal device does not support processing the first procedure and the second procedure in parallel, determine that a PCell is allowed to generate an interruption request.

11. The terminal device of claim 10, wherein the capability is associated with at least one of:

a type of the terminal device, a band combination supported by the terminal device, a first band in which the PCell is located, or a second band in which a PSCell is located.

12. The terminal device of claim 11, wherein the processor is further configured to execute the computer program to cause the terminal device to:

determine that the terminal device does not support processing the first procedure and the second procedure in parallel in response to the first band in which the PCell is located and the second band in which the PSCell is located belonging to different bands or different Frequency Ranges (FRs), and determine the capability of the terminal device based on the type of the terminal device in response to the first band in which the PCell is located and the second band in which the PSCell is located belonging to a same band or a same FR.

13. The terminal device of claim 10, wherein the first procedure comprises a part or all of a PCell handover procedure and the second procedure comprises a part or all of a PSCell addition procedure, wherein the first procedure comprises at least one of:

a synchronization procedure of the PCell; or a random access procedure of the PCell.

14. The terminal device of claim 10, wherein the processor is further configured to execute the computer program to cause the terminal device to:

perform the first procedure and the second procedure in serial in response to the capability of the terminal device indicating that the terminal device does not support processing the first procedure and the second procedure in parallel; and perform the first procedure and the second procedure in parallel in response to the capability of the terminal device indicating that the terminal device supports processing the first procedure and the second procedure in parallel.

15. The terminal device of claim 14, wherein in a case that the terminal device performs the first procedure and the second procedure in serial, a total terminal processing time for the first procedure and the second procedure is a terminal processing time corresponding to the first procedure plus a terminal processing time corresponding to the second procedure; or in a case that the terminal device performs the first procedure and the second procedure in parallel, a total terminal processing time for the first procedure and the second procedure is a maximum of a terminal processing time corresponding to the first procedure and a terminal processing time corresponding to the second procedure.

16. The terminal device of claim 14, wherein in a case that the terminal device processes the first procedure and the second procedure in parallel, a delay requirement corresponding to the terminal device is a first delay requirement, and in a case that the terminal device processes the first procedure and the second procedure in serial, a delay requirement corresponding to the terminal device is a second delay requirement, wherein the first delay requirement is different from the second delay requirement.

17. The terminal device of claim 16, wherein at least one of the first delay requirement or the second delay requirement is preconfigured by a protocol, or configured by a network device through the first indication information.

18. The terminal device of claim 10, wherein the interruption request is preconfigured by a protocol or configured by a network device through second indication information.

19. A non-transitory computer-readable storage medium for storing a computer program that causes a processor of a terminal device to perform operations comprising:

determining a capability of the terminal device, the capability comprising support or nonsupport for processing a first procedure and a second procedure in parallel, the first procedure being associated with a Primary Cell (PCell) handover, and the second procedure being associated with a Primary Secondary Cell (PSCell) addition;

performing the first procedure and the second procedure based on the capability;

reporting capability indication information, the capability indication information indicating the capability of the terminal device; and in response to the capability indication information indicating that the terminal device supports processing the first procedure and the second procedure in parallel, determining that a PCell is not allowed to generate an interruption request, or determining that the interruption request generated by the PCell is a specified interruption request; or in response to the capability indication information indicating that the terminal device does not support processing the first procedure and the second procedure in parallel, determining that a PCell is allowed to generate an interruption request.

20. The non-transitory computer-readable storage medium of claim 19, wherein the interruption request is preconfigured by a protocol or configured by a network device through second indication information.

* * * * *